United States Patent [19]

Kang et al.

[11] Patent Number: 5,780,739
[45] Date of Patent: Jul. 14, 1998

[54] TUNING FORK TYPE GYROSCOPE

[75] Inventors: Myung-seok Kang, Chungcheongnam-do; Young-ho Cho, Daejeon; Ci-moo Song, Sungnam; Sung-kie Youn, Daejeon, all of Rep. of Korea

[73] Assignees: Samsung Electronics Co., Ltd., Kyungki-do; Korea Advanced Institute of Science and Technology, Taejon, both of Rep. of Korea

[21] Appl. No.: 653,235
[22] Filed: May 24, 1996

[30] Foreign Application Priority Data

May 25, 1995 [KR] Rep. of Korea ............ 95-13258

[51] Int. Cl.⁶ ........................................ G01P 9/04
[52] U.S. Cl. ........................................ 73/504.16
[58] Field of Search ............ 73/504.16, 504.12, 73/514.32, 514.16

[56] References Cited

U.S. PATENT DOCUMENTS

| | | | |
|---|---|---|---|
| 4,524,619 | 6/1985 | Staudte | 73/504.16 |
| 4,628,734 | 12/1986 | Watson | 73/504.16 |
| 5,349,855 | 9/1994 | Bernstein et al. | 73/504.16 |
| 5,359,893 | 11/1994 | Dunn | 73/504.12 |
| 5,447,068 | 9/1995 | Tang | 73/514.32 |
| 5,495,761 | 3/1996 | Diem et al. | 73/514.32 |
| 5,569,852 | 10/1996 | Marek et al. | 73/514.16 |

Primary Examiner—Hezron E. Williams
Assistant Examiner—Helen C. Kwok
Attorney, Agent, or Firm—Burns, Doane, Swecker & Mathis, L.L.P.

[57] ABSTRACT

A tuning fork type gyroscope including plate members spaced apart from each other, vibration elements for vibrating the plate members, suspension members for suspending the plate members, and electrodes arranged in the lower portion of the plate members, wherein the suspension members comprises: main bars connected to the plate members by connection members; fixing members connected to both ends of each of said main bars so as to support the main bars and reduce (a) restoring tensile forces(s) along the length of the main bars; and a supporting member connected to (a) central portion(s) of the main bars so as to support the main bars. The gyroscope reduces the restoring tensile force of the main bars and provides flexibility to the main bars.

24 Claims, 5 Drawing Sheets

TUNING FORK TYPE GYROSCOPE

BACKGROUND OF THE INVENTION

The present invention relates to a gyroscope, and more particularly, to a tuning fork type gyroscope.

A gyroscope for detecting the angular velocity of an inertial object has been employed as a core part of a navigation apparatus for guided missiles, sea-going vessels or aircraft. Applications for the gyroscope have been extended to fields such as a navigation apparatus for automobiles and an apparatus for detecting and correcting hand quiver in a high-magnification camcorder. A conventional gyroscope employed for detecting the angular velocity is manufactured by assembling a multitude of complex parts requiring precise machining. Thus, due to the conventional gyroscope having burdensome manufacturing costs and a large structure, the conventional gyroscope is not suitable for general industrial purposes or in-home electronics.

A comb driven tuning fork type microgyroscope, shown in FIG. 1, developed by The Charles Stark Draper Laboratory, is disclosed in U.S. Pat. No. 5,349,855. Here, a solid and dotted line-hatched portions represent electrodes (terminals) and a fixed structure, respectively, and unhatched portion represents suspended structure, as shown in FIG. 1.

Referring to FIG. 1, combs 102a and 102b are formed on either side of a plate member 101a and combs 102c and 102d are formed on either side of a plate member 101b. Main bars 104a and 104b are connected to the plate members 101a and 101b by connection members 103a and 103b, and are supported by fixing portions 105a and 105b. Fixing structures 106a, 106b and 106c have combs 107a, 107b, 107c and 107d each meshed with the combs 102a, 102b, 102c and 102d of the plate members 101a and 101b at intervals of predetermined distance, respectively.

Electrodes 108a and 108b are disposed in the lower part of the plate members 101a and 101b, and terminals 109a, 109b, 109c, 109d and 109e each apply a voltage to the fixing structures 106a, 106b and 106c and the electrodes 108a and 108b, respectively.

In the above-mentioned gyroscope, when an alternating current (AC) voltage is applied to the terminals 109a, 109b, 109c, 109d and 109e, an electrostatic force is generated between the combs 102a, 102b, 102c and 102d and the combs 107a, 107b, 107c and 107d of the fixing structures 106a, 106b and 106c, to thereby vibrate the plate members 101a and 101b along the X-axis. The combs 107b and 107c of the fixing structure 106b are used for detecting the positions of the plate members 101a and 101b on the X-axis. At this time, if the gyroscope rotates around the Y-axis with the angular velocity Ω, the plate members 101a and 101b are acted on by a Coriolis force in the Z-axis. Accordingly, the plate members 101a and 101b are displaced along the Z-axis, and the angular velocity Ω is detected by measuring the capacitance difference according to the change in distance between the plate members 101a and 101b and the electrodes 108a and 108b.

In the conventional gyroscope as mentioned above, since only the middle portions of the main bars 104a and 104b are supported, the displacement of the plate members 101a and 101b in the Z-axis due to the Coriolis force is not uniform. Thus, the change of capacitance according to the displacement of the plate members 101a and 101b in the Z-axis becomes non-linear.

In another conventional gyroscope, as shown in FIG. 2, a pair of parallel main bars 201a and 201b are provided, both ends of which are supported by fixing portions 202a, 202b, 202c and 202d.

However, in operation of such a gyroscope, plate members 203a and 203b and electrodes 204a and 204b do not maintain a uniform distance therebetween. Further, as shown in FIG. 3, the displacement of the middle portions of the main bars 201a and 201b is large causing the distance between the plate members 203a and 203b and electrodes 204a and 204b to become non-uniform, thereby producing noise. Also, since the main bars 201a and 201b are fixed at both ends respectively, when the displacement is large, the restoring tensile force along the length of the main bars 201a and 201b becomes larger than the Coriolis force, which is undesirable. Moreover, when the plate members 203a and 203b vibrate up and down, it is preferable that the main bars 201a and 201b have torsional flexibility to a certain extent. However, the main bars 201a and 201b remain rigid because they are fixed by fixing portions 202a, 202b, 202c and 202d.

SUMMARY OF THE INVENTION

Accordingly, it is an object of the present invention to provide a tuning fork type gyroscope for reducing a restoring tensile force along the length of a main bar which occurs as displacement in a Z-axis direction of plate members becomes large, and for removing non-linearity of the change in capacitance according to an angular velocity.

To achieve the above objects, there is provided a tuning fork type gyroscope comprising plate members spaced apart from each other, vibration means for vibrating the plate members, suspension means for suspending the plate members, and electrodes arranged in the lower portion of the plate members, wherein the suspension means comprises: main bars connected to the plate members by connection members; fixing means connected to either end of the main bar so as to support the main bar and reduce a restoring tensile force along the length of the main bar; and supporting means connected to the middle portion of the main bar so as to support the main bar.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 1:
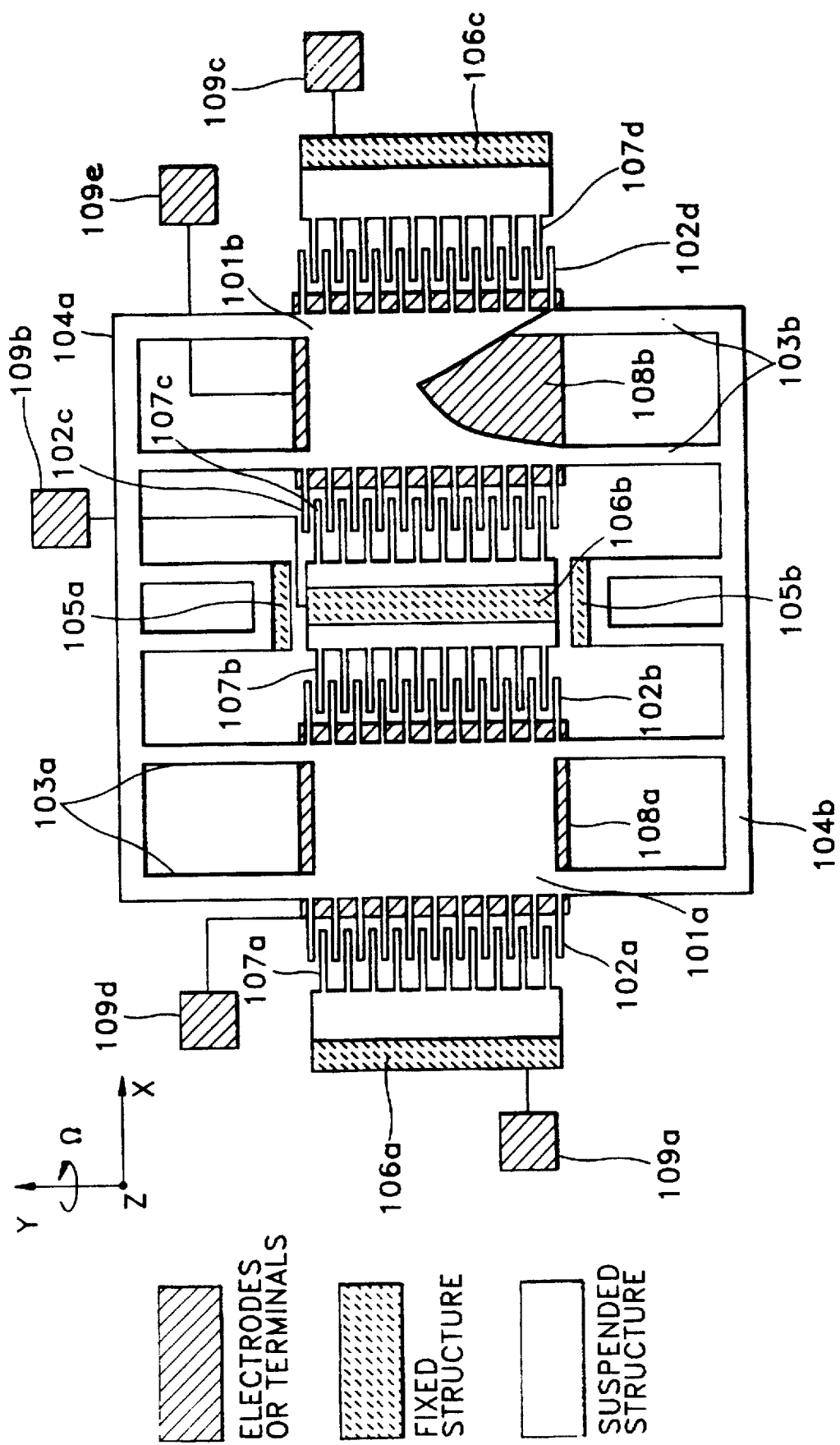
FIG. 1 is a plan view of a conventional gyroscope.
Figure 2:
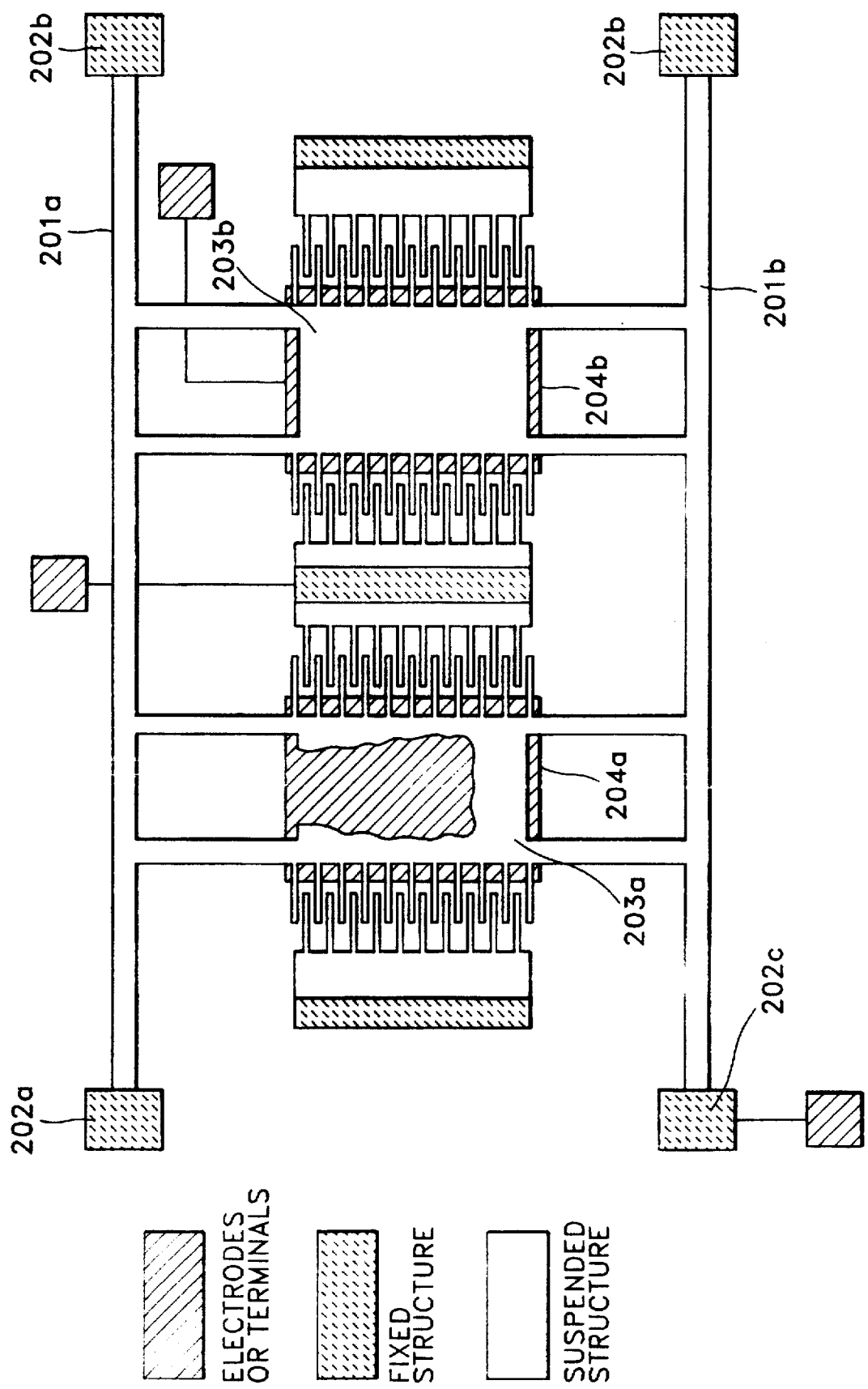
FIG. 2 is a plan view of another conventional gyroscope.
Figure 3:
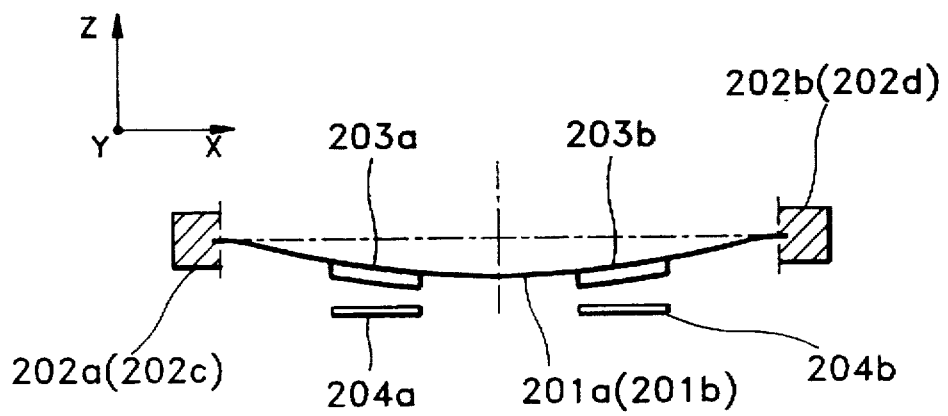
FIG. 3 is a side view of a vibrating state of the gyroscope of FIG. 2.
Figure 4:
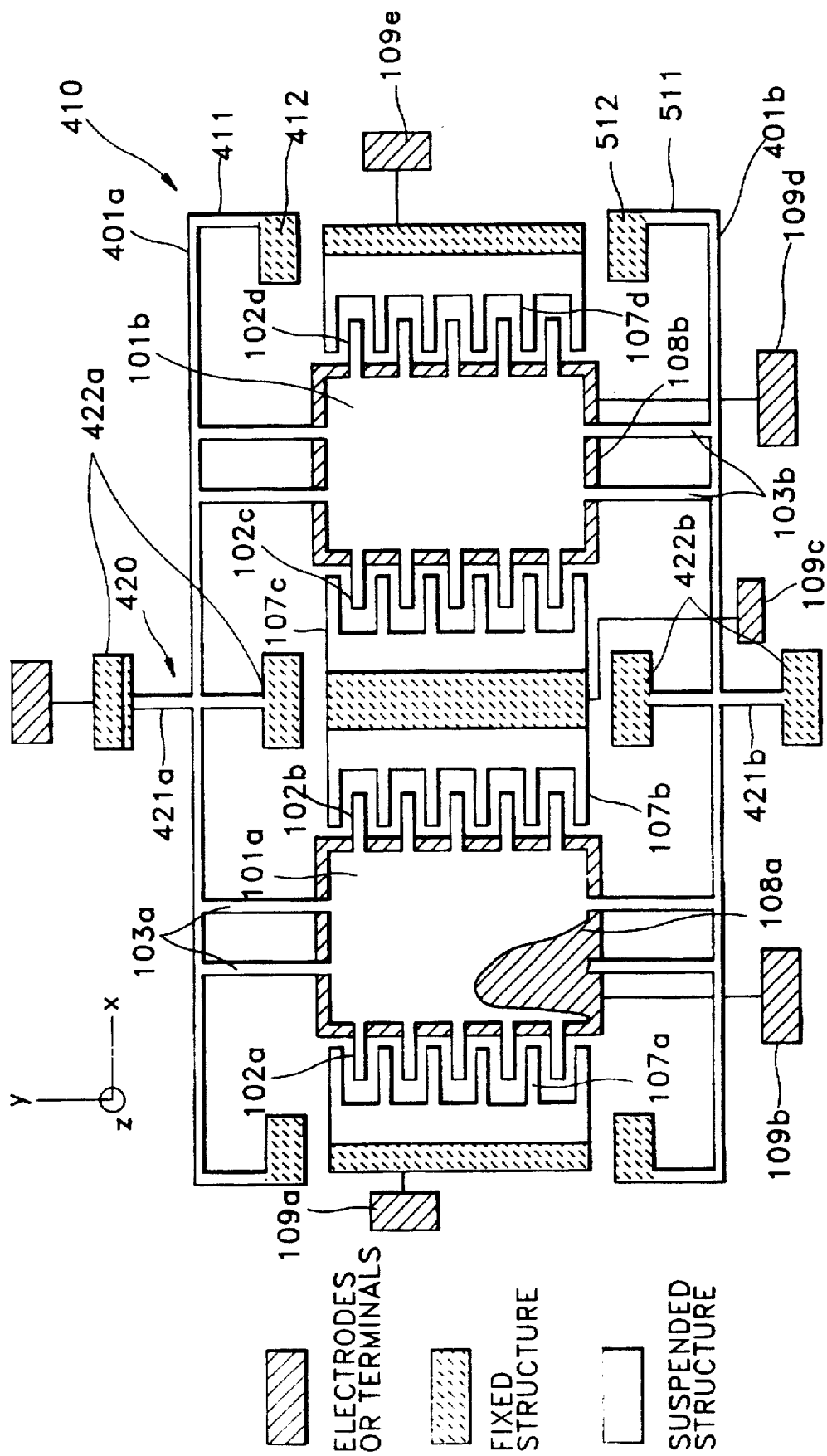
FIG. 4 is a schematic view of a tuning fork type gyroscope according to the present invention.

FIG. 4 shows (an embodiment of) a tuning fork type gyroscope according to the present invention. Here, the same reference numerals are used for elements that are the same as that of FIG. 1.

Referring to FIG. 4, vibration means for vibrating plate members 101a and 101b include combs 102a, 102b, 102c and 102d, respectively, protruding from either side of the plate members 101a and 101b, other combs 107a, 107b, 107c and 107d each meshed with the plate member combs 102a, 102b, 102c and 102d at intervals of a predetermined distance, respectively, and terminals 109a, 109b, 109c, 109d and 109e for applying electric power to the combs 102a–102d and 107a–107b. Suspension means for suspending the plate members 101a and 101b with respect to the upper portion of electrodes 108a and 108b include: main bars 401a and 401b on which connection members 103a and 103b connected to the plate members 101a and 101b are formed; fixing means 410 connected to both ends of the main bars 401a and 401b, respectively for supporting the main bars 401a and 401b and reducing the restoring tensile force of the main bars 401a and 401b by allowing the main bars 401a and 401b to be relaxed in the length direction; and supporting means 420 for supporting the middle portions of the main bars 401a and 401b.

The fixing means 410 includes a buffer portion 411 extending perpendicularly from the ends of the main bars 401a and 401b and a fixing portion 412 connected to the buffer portion 411 and fixed to the circuit board (not shown).

Figure 5:
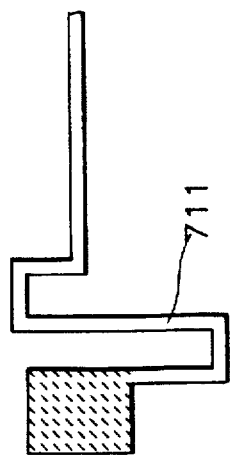
FIGS. 5 through 7 are plan views showing embodiments of fixing means of the gyroscope of the present invention.
Figure 6:
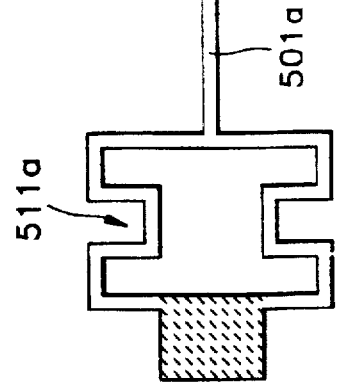
Figure 7:
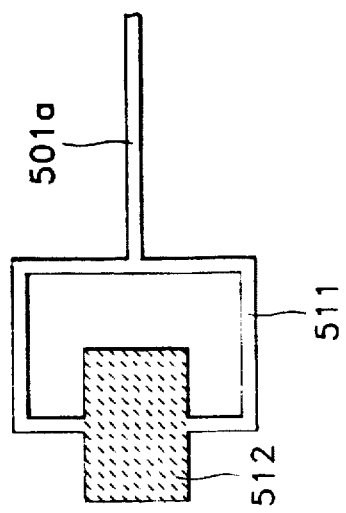

Other embodiments of the fixing means 410 are shown in FIGS. 5 through 7. Referring to FIG. 5, a main bar 501a is connected to a fixing portion 512 by a rectangular ring-shaped buffer portion (511). The buffer portion 511 may have at least one U-shaped bending portion 511a as shown in FIG. 6 so as to buffer the tensile force along the length of the main bar 501a. In FIG. 7, there is provided a square wave-shaped buffer portion 711.

The supporting means 420 of FIG. 4 has distortion bars 421a and 421b extending perpendicularly from either side of the middle portions of the main bars 401a and 401b, i.e. the portions of the main bars 401a and 401b having the largest displacement during vibration, and fixing portions 422a and 422b connected to ends of the distortion bars 421a and 421b and fixed to the circuit board.

Figure 8:
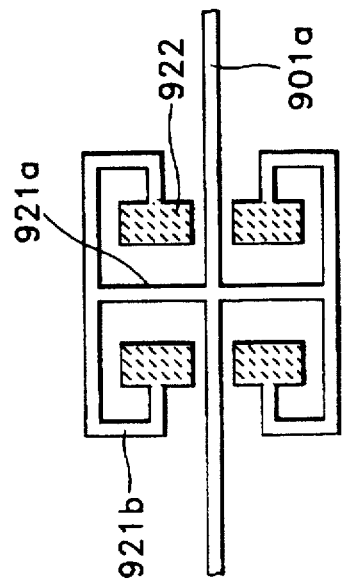
FIGS. 8 and 9 are plan views showing embodiments of supporting means of the gyroscope of the present invention.
Figure 9:
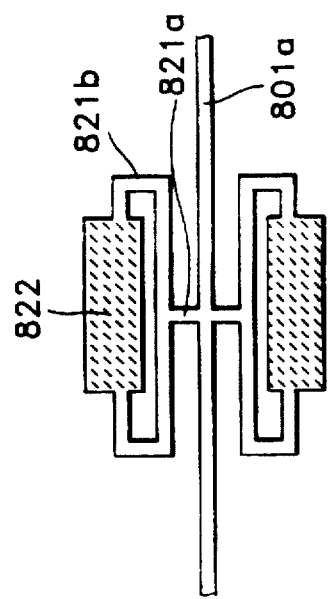

Other embodiments of the supporting means 420 (in FIG. 4) are shown in FIGS. 8 and 9. In FIG. 8, connection bars 821a extend perpendicularly from either side of a main bar 801a. A rectangular ring-shaped distortion portion 821b which is connected to a fixing portion 822 is connected with end of the connection bar 821a so as to provide additional flexibility. In FIG. 9, the supporting means 420 (in FIG. 4) includes connection bars 921a extending perpendicularly from either side of a main bar 901a, the distortion bars 921b extending perpendicularly from either side of ends of the connection bars 921a and are bent inward at their ends, and fixing portions 922 to which the bent ends of the distortion bars 921b are connected.

The fixing means and the supporting means are not limited to the disclosed embodiments but any structure which reduces the restoring tensile force and distortion as the plate member vibrates may be included in the present invention.

According to the present invention, as shown in FIG. 4, it is preferable that the connection members 103a and 103b for supporting the plate members 101a and 101b be placed at portions of the main bars 401a and 401b where the displacement of the main bars 401a and 401b in a Z-axis direction is maximum.

Figure 10:
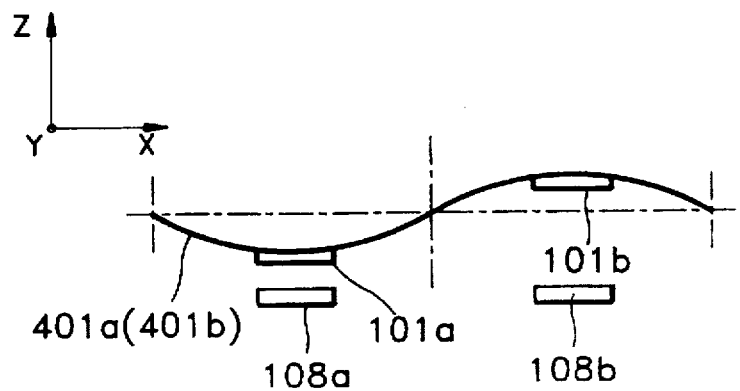
FIG. 10 is a side view of a vibrating state of the tuning fork type gyroscope according to the present invention.

Referring to FIG. 10, in operation of the gyroscope according to the present invention, when the main bars 401a and 401b vibrate, the distance between the plate members 101a and 101b and the electrodes 108a and 108b is uniform. Thus, the change of capacitance according to the change in angular velocity is linear.

In the tuning fork type gyroscope according to the present invention, when the plate member vibrates, the fixing means and the supporting means reduce the restoring tensile force along the length of the main bar and maintains a uniform distance between the plate member and the electrode, to thereby prevent noise and detect the angular velocity more accurately.

It is noted that the present invention is not limited to the preferred embodiment described above, and it is apparent that variations and modifications by those skilled in the art can be effected within the spirit and scope of the present invention defined in the appended claims.

What is claimed is:

1. A tuning fork type gyroscope comprising plate members spaced apart from each other, vibration means for vibrating said plate members, suspension means for suspending said plate members, and electrodes arranged in the lower portion of said plate members, wherein said suspension means comprises:

main bars;

fixing means connected to both ends of each of said main bars so as to support said main bars and reduce a restoring tensile force along the length of said main bars; and supporting means connected to a central portion of each of said main bars so as to support said main bars; wherein said plate members are connected to said main bars at a portion on said main bars intermediate to the ends of said main bars and said supporting means.

2. A tuning fork type gyroscope according to claim 1, wherein said fixing means comprises a buffer portion connected to the ends of each of said main bars and a first fixing portion connected to said buffer portion so as to support each of said main bars.

3. A tuning fork type gyroscope according to claim 2, wherein said buffer portion extends perpendicularly from the ends of each of said main bars.

4. A tuning fork type gyroscope according to claim 2, wherein said buffer portion is formed in the shape of a rectangular ring.

5. A tuning fork type gyroscope according to claim 4, wherein said buffer portion has at least one U-shaped bending portion formed therein.

6. A tuning fork type gyroscope according to claim 2, wherein said buffer portion is formed in the shape of a square wave.

7. A tuning fork type gyroscope according to claim 1, wherein said supporting means comprises distortion bars extending perpendicularly from at least one side of said central portion of each of said main bars and a fixing portion connected to at least one end of each of said distortion bars so as to support said main bars.

8. A tuning fork type gyroscope according to claim 1, wherein said supporting means comprises connection bars extending perpendicularly from at least one side of said central portion of each of said main bars, a rectangular ring-shaped distortion portion connected to at least one end of each of said connection bars and a fixing portion connected to said distortion portion so as to support said main bars.

9. A tuning fork type gyroscope according to claim 1, wherein said supporting means comprises connection bars extending perpendicularly from at least one side of said central portion of each of said main bars, distortion bars extending perpendicularly from at least one side of at least one end of each of said connection bars and being bent inward at the ends of said connection bars, and a fixing portion connected to at least one end of each of said distortion bars.

10. A tuning fork type gyroscope according to claim 1, wherein said plate members are connected to portions of each of said main bars at points where the displacement of each of said main bars is maximum.

11. A tuning fork type gyroscope according to claim 1, wherein said plate members are connected to said main bars by connection members.

12. A tuning fork type gyroscope according to claim 11, wherein said connection members are connected to portions of each of said main bars at points where the displacement of each of said main bars is maximum.

13. A method of supporting plate members spaced apart from each other in a tuning fork type gyroscope comprising vibration means for vibrating said plate members, suspension means for suspending said plate members, and electrodes arranged in the lower portion of said plate members, wherein said method comprises the steps of:

connecting main bars to fixing means at both ends of each of said main bars to reduce a restoring tensile force along the length of said main bars;

connecting said main bars to supporting means at a central portion of each of said main bars so as to support said main bars; and connecting said plate members to said main bars at a portion on said main bars intermediate to the ends of said main bars and said supporting means.

14. The method of claim 13, wherein the step of connecting fixing means comprises the steps of:

connecting a buffer portion to the ends of each of said main bars; and connecting said buffer portion to a first fixing portion so as to support each of said main bars.

15. The method of claim 14, wherein the step of connecting a buffer portion comprises the step of extending said buffer portion perpendicularly from the ends of each of said main bars.

16. The method of claim 14, wherein the step of connecting a buffer portion comprises the step of forming the shape of a rectangular ring with said buffer portion.

17. The method of claim 14, wherein the step of connecting a buffer portion comprises the step of forming at least one U-shaped bending portion in said buffer portion.

18. The method of claim 14, wherein the step of connecting a buffer portion comprises the step of forming the shape of a square wave with said buffer portion.

19. The method of claim 13, wherein the step of connecting supporting means comprises the steps of:

extending said distortion bars perpendicularly from said supporting means from at least one side of central portion of each of said main bars; and connecting a fixing portion to at least one end of each of said distortion bars so as to support said main bars.

20. The method of claim 13, wherein the step of connecting supporting means comprises the steps of:

extending connection bars perpendicularly from said supporting means from at least one side of said central portion of each of said main bars;

connecting a rectangular ring-shaped distortion portion to at least one end of each of said connection bars; and connecting a fixing portion to said distortion portion so as to support said main bars.

21. The method of claim 13, wherein the step of connecting supporting means comprises the steps of:

extending connection bars perpendicularly from at least one side of said central portion of each of said main bars;

extending distortion bars perpendicularly from at least one side of at least one end of each of said connection bars;

bending the ends of said connection bars inward; and connecting a fixing portion to at least one end of each of said distortion bars.

22. The method of claim 13, wherein the step of connecting said plate members further comprises the step of connecting said plate members to portions of each of said main bars at points where the displacement of each of said main bars is maximum.

23. The method of claim 13, wherein the step of connecting said plate members comprises the step of connecting said plate members to said main bars by connection members.

24. The method of claim 23, wherein the step of connecting said plate members further comprises the step of connecting said connection members to portions of each of said main bars at points where the displacement of each of said main bars is maximum.

* * * * *